UNITED STATES PATENT OFFICE.

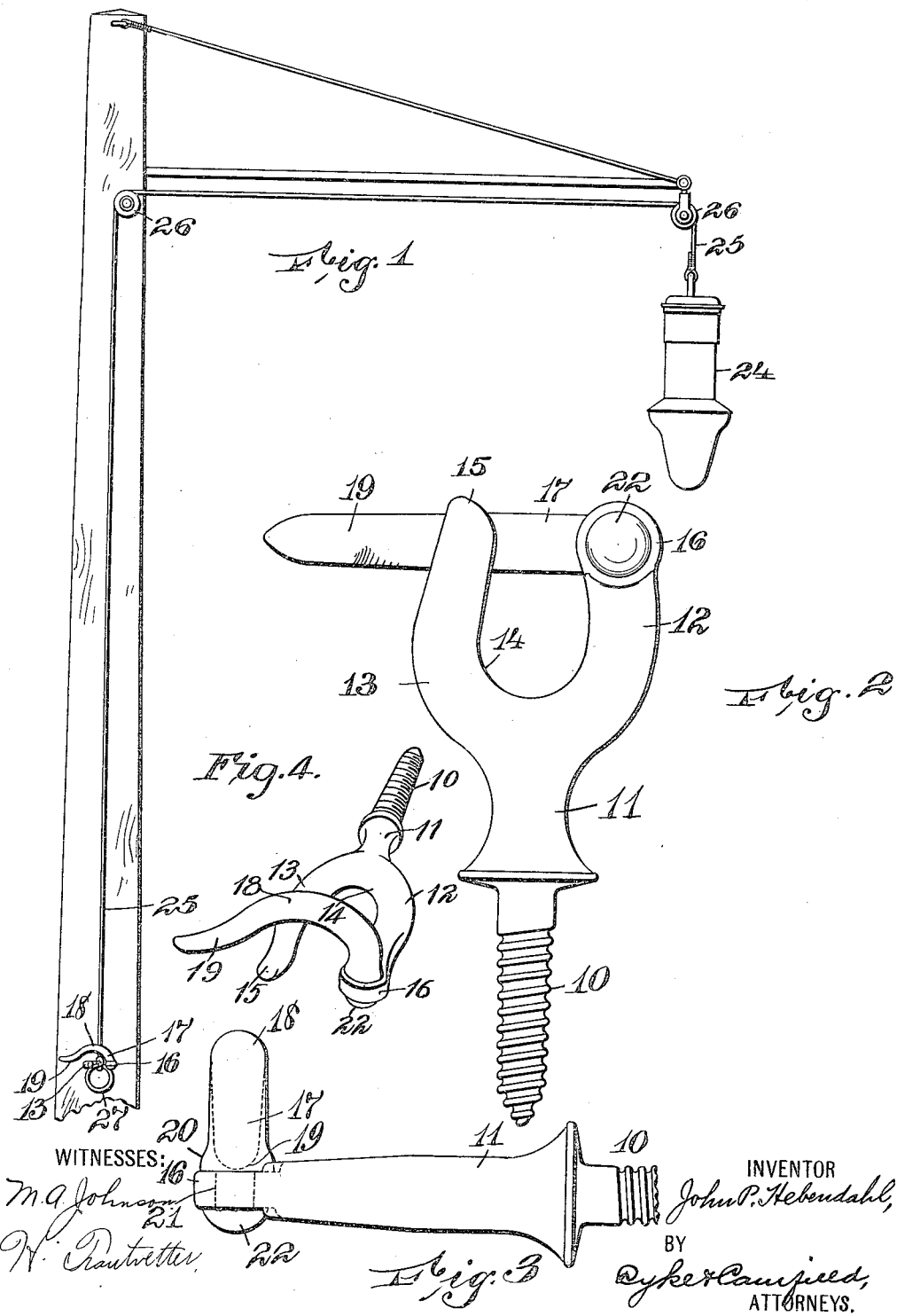

JOHN P. HEBENDAHL, OF ELIZABETH, NEW JERSEY.

HOOK.

1,137,616.

Specification of Letters Patent.   Patented Apr. 27, 1915.

Application filed February 28, 1914.   Serial No. 821,682.

*To all whom it may concern:*

Be it known that I, JOHN P. HEBENDAHL, a citizen of the United States, and a resident of Elizabeth, county of Union, and State of New Jersey, have invented certain new and useful Improvements in Hooks, of which the following is a specification.

This invention relates to a hook that is designed to act to guide a rope or the like, the hook having means to close it so that the rope when straight and taut cannot leave the hook, but when the rope is twisted or turned in the hook it can be taken therefrom. The hook is further designed to act as a stop for a knot, ring or other enlargement placed on the rope, the rope being confined when so stopped and not easily removed by accident. The hook is adapted for different uses, but for the purposes of a clear description it is described and illustrated in this application as applied to a pole on which an electric light is suspended and used to hold such light in its suspended position.

The invention is illustrated in the accompanying drawings, in which—

Figure 1 is a front view of the hook, and a representation of a pole and a rope suspending an arc lamp to illustrate one use of the hook. Fig. 2 is a bottom view of the hook shown in Fig. 1, and Fig. 3 is a side view of the hook. Fig. 4 is a perspective view of the hook.

The hook can be secured to a pole or other support in any usual manner by screws, nails or like fastening means, but I prefer to form the hook with a shank 10 formed as a spike, but usually provided with screw threads of a wide pitch, so that the installation of the hook can be facilitated. The inner end of the shank has a flange 11 to act as a stop for the shank and also to prevent side twisting when the hook is in place, but the flange is not essential and can be dispensed with.

Beyond the flange the shank is formed into a yoke having the two arms 12 and 13 with the smooth inside face 14, so that the strand or rope in the hook can slide easily along the inside of the yoke. One arm, as 13, has its end 15 curved outward to a slight extent. The second arm 12 has its outer end 16 made heavy enough to act as a support for a finger 17. The finger 17 is arranged so that it extends transversely across the open part of the yoke and slightly within the ends of the arms of the yoke, thereby closing the yoke in so as to prevent removal of a straight element held in the hook. The finger 17 is curved upwardly from the arm 12 to form a hump 18 and then above the end 15 and slightly within the line of said end, the finger then extending beyond the arm 13 with its lower edge 19 slightly curved outward and upward to form a guide for a bent strand or rope to be inserted in the hook. The finger 17 can be secured to the arm 12 in any desired manner, the preferred way, however, being by forming the end 16 into an eye, the finger 17 having a flange 20 and a rivet 21 on its end, the rivet being headed as at 22 to positively secure the finger to the arm in fixed position.

One manner of using the hook is shown in Fig. 1. The hook is illustrated as secured to a pole 23, on which is suspended an arc lamp 24 or any other object, the lamp being suspended by a rope 25 passing over suitable non-friction devices, as pulleys 26. The rope 25 can be knotted or supplied with other protuberance as the ring 27. The ring is held against further upward movement by its engagement with the yoke. The hook when placed well up on the pole appears to a boy or a short person as being a closed loop, as in Fig. 2. The rope cannot be removed from the hook except by twisting it and passing it out between the arm 13 and finger 17. It can be engaged in the same way. When a person wishes to lower the lamp, the ring 27 is secured to the end of an additional rope and when released, as above described, can be let out to the proper extent.

The hook above described is cheap and has no moving parts to get out of order. The proportions and particular formation of the parts are not essential and can be varied without departing from the scope of my invention.

Having now described my invention, what I claim is:

A hook comprising a yoke having arms of substantially equal length, the first arm having an eye on its end, a finger with one end passing downward through the eye and headed, the finger extending straight across the end of the second arm and being arched so as to provide a space between the finger and said second arm, the first arm having a free end devoid of any head.

In testimony that I claim the foregoing I have hereto set my hand this 26th day of February, 1914.

JOHN P. HEBENDAHL.

Witnesses:
WM. H. CAMFIELD,
M. A. JOHNSON.

Copies of this patent may be obtained for five cents each, by addressing the "Commissioner of Patents, Washington, D. C."